March 25, 1952 S. V. FORGUE 2,590,764

COLOR TELEVISION IMAGE TUBES

Filed Feb. 23, 1950 2 SHEETS—SHEET 1

INVENTOR
Stanley V. Forgue
BY
Roderick Malcolm
ATTORNEY

INVENTOR
Stanley V. Forgue
BY
Roderick Malcolm
ATTORNEY

Patented Mar. 25, 1952

2,590,764

UNITED STATES PATENT OFFICE 2,590,764

COLOR TELEVISION IMAGE TUBE

Stanley V. Forgue, Cranbury, N. J., assignor to Radio Corporation of America, a corporation of Delaware Application February 23, 1950, Serial No. 145,861

23 Claims. (Cl. 313—92)

This invention relates to improved television image tubes, and, more particularly, to improvements in color television image tubes.

It is an object of the present invention to provide an image tube capable of producing polychromatic images without the use of complex optical mixing or of mechanically moving filters.

Another object of the invention is to provide a color image tube which shall lend itself readily to mass production at reasonable cost.

A further object of the invention is to provide a color television image tube the successful operation of which does not depend on accurate cyclic scanning of the beam upon discrete elementary areas of a fluorescent target.

Still another object of the invention is to provide a color television image tube the operation of which is not easily disturbed by stray fields.

In general, the above objects are attained by the use of a laminated target assembly comprising a number of closely-spaced alternate fluorescent screens and control grids. An electron beam penetrates the assembly to different depths, under control of the grids, to produce a different monochromatic image on each screen. The several monochromatic images coincide so that when the assembly is viewed (from its front) they appear as a single polychromatic image. The fluorescent screen facing the window of the tube "screen 1" is translucent. It comprises a very thin fluorescent coating on a glass plate. Therefore, an image produced on this screen can be viewed simultaneously with an image produced on the next adjacent fluorescent screen. This next fluorescent screen "screen 2" is carried on the front side of a thin, multi-apertured plate through which the electron beam may pass. When screen 1 is to be energized, electrons are allowed to pass through this multi-apertured plate and to continue in the forward direction until they impinge upon said screen. On the other hand, when screen 2 is to be energized, the electrons, after being allowed to pass through its plate, are reflected back against its front side, i. e., upon the fluorescent screen 2. When three or more color component images are required, additional screens similar to screen 2 may be provided. From back to front, the successive apertured plates on which the fluorescent images appear have increasingly large ratios of apertured to solid surface, in order to permit all of these images to be viewed by an observer looking into the window of the tube.

Figures 1, 2, 4, 5, 6, 6A:
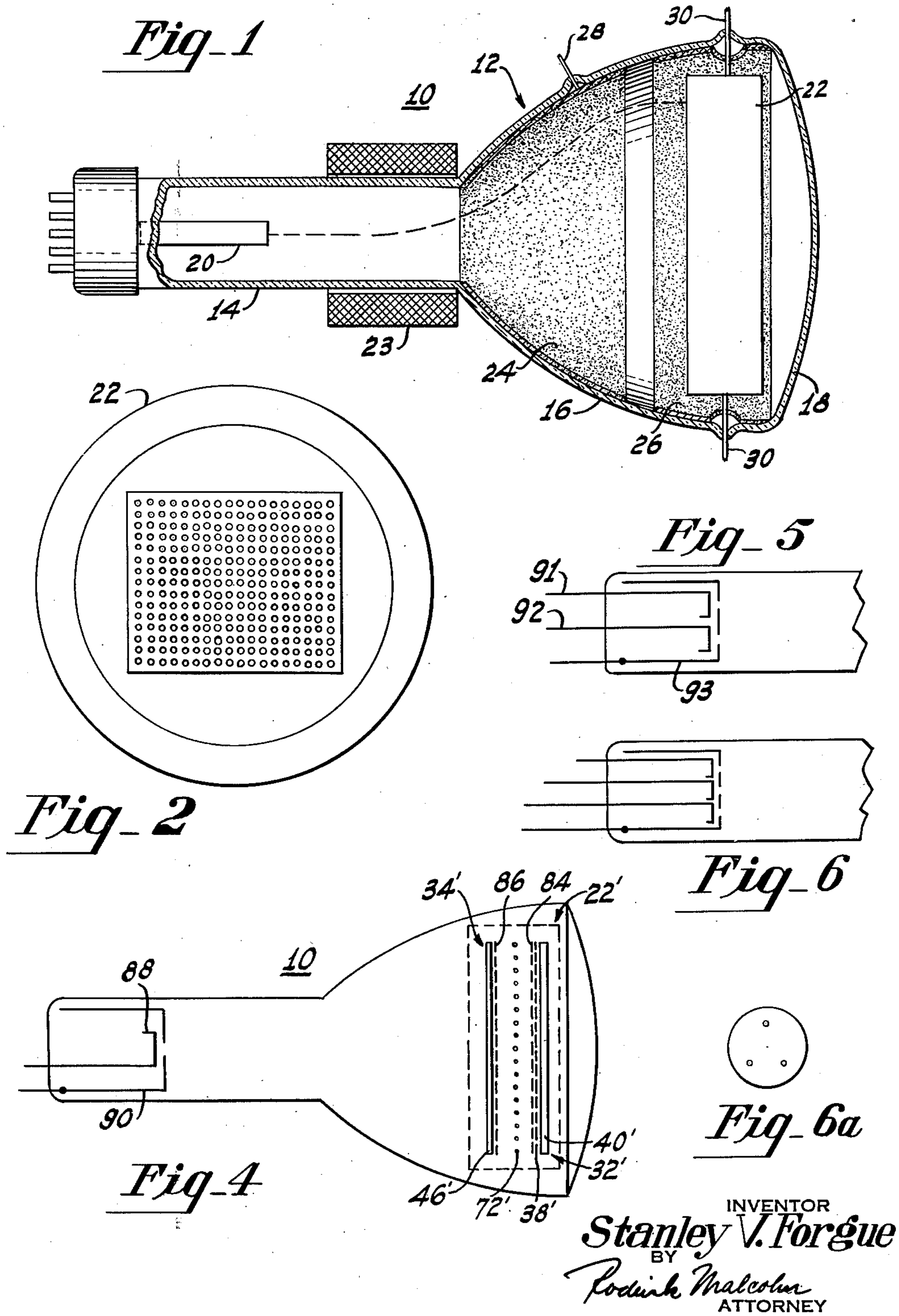
Fig. 1 represents an embodiment of the invention with part of the envelope taken in section.
Fig. 2 is an end view of the target assembly of the tube shown in Fig. 1.
Fig. 4 is a diagrammatic representation of another embodiment of this invention.
Figs. 5, 6 and 6*a* show modifications of the embodiments of Figs. 4 and 3 respectively.

The picture tube 10 shown in Fig. 1 represents broadly a combination of elements embodying the principles of the present invention. It includes an envelope 12 having a neck portion 14, a substantially frusto-conical portion 16 and a relatively flat window portion 18. Within neck portion 14 there is mounted an electron gun 20 which is directed toward a target assembly 22. As will be seen, the electron gun 20 may comprise a single cathode or a plurality of cathodes. In the most typical use of tube 10, a deflection yoke 23 will be slipped over neck 14 to a position adjacent the cone 12 where it will serve to deflect the beam in two co-ordinates to produce a picture raster.

As will become more apparent from a description which is to follow, the best operation of tube 10 will occur if the beam electrons reach all parts of the gun side of the target assembly 22 with substantially the same forward velocity. Normally this does not occur, since wherever the beam is deflected from its mean axis, a small part of the forward energy of each of its electrons is converted into radial energy. Accordingly, in the preferred practice of the present invention a large-diameter electrostatic lens is provided in the region immediately behind the target assembly (i. e., on its gun side) for straightening out the beam after it has been deflected far enough to reach any desired position opposite a point in the picture raster. In other words, the lens acts so that, as shown by a dotted line representing a typical path for the beam, the last part of the path of the electrons to the target assembly will always be at right angles thereto. The electrodes for this lens comprise two symmetrical conductive coatings 24, 26 which are formed on the inside surface of the frusto-conical portion 16. In the operation of the tube, these coatings will be polarized at different potentials to set up between their opposed circular edges equipotential surfaces which are appropriately curved to constitute a double convex electron lens. The coating 24 is provided with a terminal pin 28 which extends from it through the wall of the envelope for convenient connection to an external source of potential. Each of a plurality of terminal pins 30 has one of its ends sealed through the wall of the envelope 12 in the boundary region between the frusto-conical and window portions (16 and 18 respectively) while its other end is bent at right angles toward the gun 20 to provide a resilient support for the assembly 22. Inside the envelope each of the terminal pins 30 is connected to one of the tube elements, such as to one of the electrodes comprised in the target assembly or to the coating 26.

Figure 3:
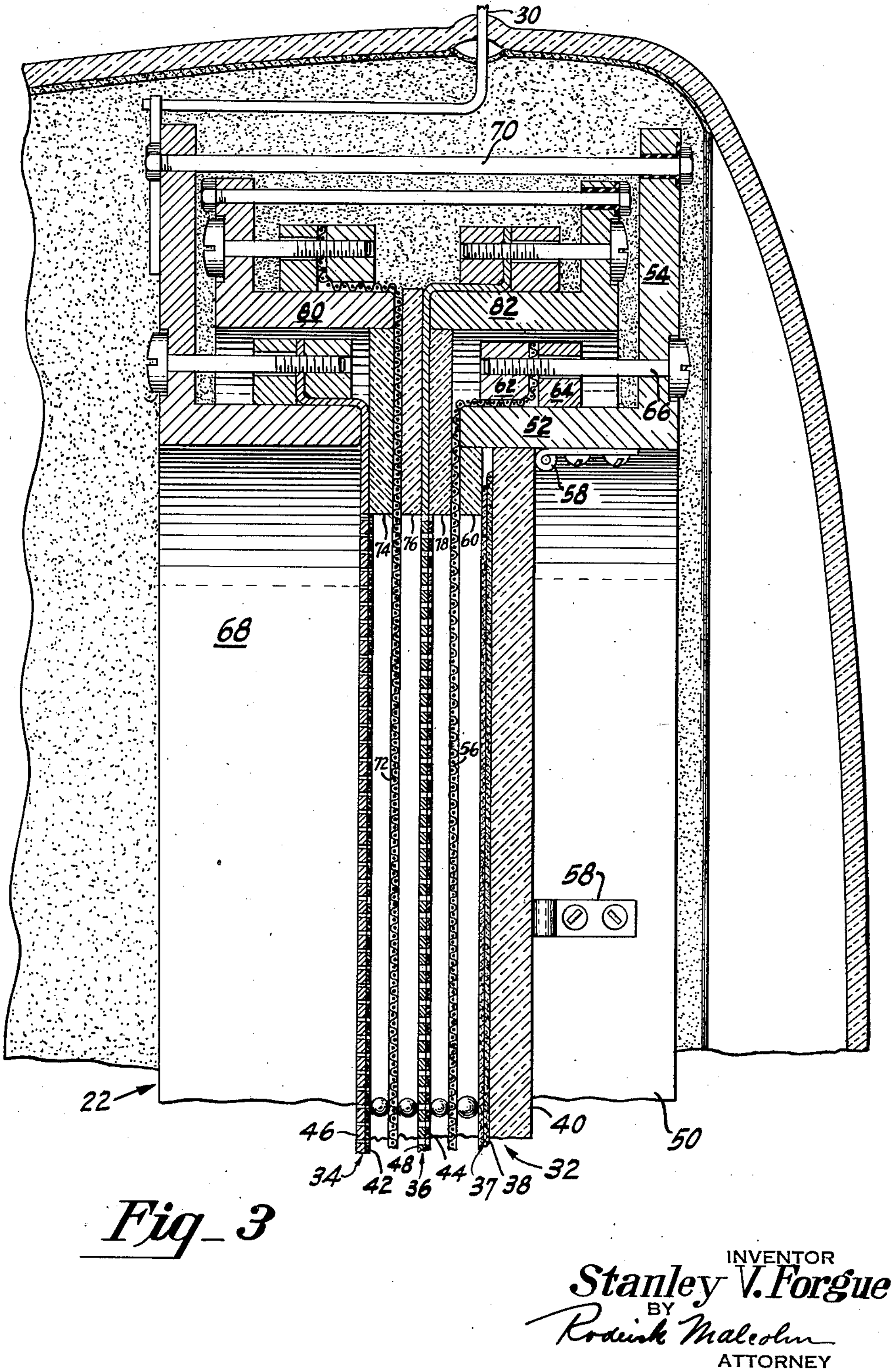
Fig. 3 is a cross sectional view of a portion of a color kinescope embodying the invention. This view, which is not to scale, shows structural details of the target assembly.

The target assembly 22 shown in detail in Fig. 3, which is a type suitable for a three-color system, utilizes three mono-chromatic screens (or "target electrodes"), a green-fluorescent front screen 32, a blue-fluorescent back screen 34, and a red-fluorescent intermediate screen 36. For proper operation of this device, each of the fluorescent screens must meet a number of requirements. Each of them must have sufficient conductivity in all directions along its surface so that it may be maintained at a uniform high potential with respect to the cathode and its light emissions must be viewable from its front side; the back and intermediate screens, 34, 36 must be permeable to the electron beam; and the front and intermediate screens, 32, 36 must have an adequate percentage of light transmission. The stated requirements for the front screen 32 are met if its thin fluorescent coating 37 is carried on a transparent conductive film 38 which in turn is carried on the back surface of a solid glass plate such as plate 40. The conductive film 38 may be formed of any of a number of stannic oxide types of substances such as that known by the trade name "Nesa" which is obtainable from the Pittsburgh Plate Glass Company of Pittsburgh, Pennsylvania. On the other hand, the stated requirements for the intermediate and back screens 36, 34, are met if their fluorescent coatings 44, 42 are carried on the front surfaces of multi-apertured metal plates. such as plates 46 and 48 respectively.

As shown in Fig. 2, the apertured area of a multi-apertured plate may be restricted to correspond to the shape intended for display of images to be produced by tube 10. A conductive lead, not shown, extends from the Nesa film 38 to one of the terminal pins 30. Each of the screens (along with their respective leads) should be insulated from other portions of the assembly 22 so that (by connecting it to an external source) it may be polarized at a high voltage, such as at 8000 volts, independently of the potentials of the other components of the assembly.

The glass plate 40 is carried within a rigid circular frame 50 which comprises a short drum-shaped portion 52 and a flange 54 attached to the front end thereof. A front control grid 56 is stretched tautly over the back end of the drum 52 in the fashion of a drumhead and the plate 40 is urged toward it by a number of spring clips 58. In this arrangement plate 40 is spaced about .03 inch from grid 56, (and its Nesa film 38 is insulated therefrom) by a circular insulating shim 60. If desired, the fluorescent coating 37 (and the film 38) may be carried on the window portion 18 instead of on a separate plate 40. However, in such a case, the window portion should be a flat face plate.

The control grids used herein may be composed of stainless steel wire having a diameter of the order of .0014 inch and woven with a mesh of 230 to the inch. While such a grid does not have perfectly smooth front and back surfaces, the variations therein are so small with respect to the thickness of the open space between either of these surfaces and the adjacent fluorescent screen that they have only negligible effects on the flatness of the equipotential surfaces set up in this space during operation.

The edges of the grid 56 are clamped between a pair of tension rings 62, 64 by a plurality of screws, not shown, and the resulting tension assembly is drawn forward on the drum 52 toward the flange 54 by a plurality of tension screws 66 until the circular center portion of the grid is perfectly flat and is under such tension that it will not readily sag or vibrate. A third protective layer of gold may be sputtered onto each of the control grids used herein to reduce any tendency to emit secondary electrons and also to protect them against corrosion.

On the back of assembly 22 there is a circular frame 68. It is shaped and dimensioned exactly like frame 50 and serves to carry the multi-apertured plate 46 in exactly the same manner as that frame carries the front grid 56.

The apertured plates used herein are differently formed from the control grids. The reason for this is that each control grid should have the least possible amount of solid structure commensurate with its operativeness as a control electrode and with mechanical strength requirements, whereas each apertured plate must have a sufficient amount of unapertured surface to provide a foundation for a fluorescent screen. Suitable plates may be formed of thin copper sheets by a photo-engraving-and-etching process. According to this process an exact replica of the screen is first drawn with pen and ink, this being done on a scale very much larger than one-to-one, if it will be helpful (for attaining precision); a reduced facsimile of the replica is photographically produced if necessary; the thin copper sheet is coated with a photo-sensitive material, such as a photo-sensitive material which contains albumen whereby it is adapted to harden on exposure to light; a light-image of the replica is projected onto the copper sheet; the unhardened portions of the photo-sensitive material are washed away; and the copper sheet is etched through in places exposed by the washing.

In the completed assembly 22 the two circular frames 50 and 68 and the elements which they carry are urged toward one another and held together by a plurality of elongated bolts 70 while at the same time they are spaced apart by a group of juxtaposed elements which is inserted between them and includes a back control grid 72, the intermediate screen 36, and three circular insulating shims 74, 76, 78. This group of elements may first be put together as a sub-assembly and then the front and back circular frames may be added to its opposite sides to produce the complete assembly 22. This sub-assembly comprises two inner circular frames 80, 82 which serve the same purpose as the circular frames 50 and 68. The back inner frame 80 supports the back control grid 72 and the front inner frame 72 carries the intermediate screen 36. The drum-portion of each of the inner circular frames is substantially shorter in length and larger in diameter than the corresponding portion of the frames 50, 68, thus permitting the nested arrangement shown in Fig. 3.

In some embodiments, using large diameter screens and grids, small glass balls 83 (having a diameter of the order of 30 mils) have been used as spacers between adjacent electrodes of assembly 22. Each ball was kept in place by being seated in an aperture and by the use of cement.

Preferably, apertured plate 48 should have a higher transmission ratio than apertured plate 46 so that an image produced on the back screen 34 will be visible through the intermediate screen 36 as viewed from the front of the tube. Suitable transmission percentages are between fifty and sixty per cent for the intermediate plate and about forty per cent for the back plate. Preferably the same number of apertures should be used in each of these two plates and they should be positioned in identical geometric patterns so that it is possible for each and every aperture of one plate to be aligned with a corresponding aperture of the other. When such alignment is attained, substantially all of the beam electrons which pass through a particular aperture of the back plate 46 are free to pass through a corresponding (and larger) aperture of the intermediate plate 48 unless they are purposely stopped by the back control grid 72.

In an arrangement of the kind shown herein it is not difficult to form the fluorescent coatings, since each of them may cover all of one surface of the element which supports it and does not have to be divided into elementary or subelementary areas. Accordingly, the coatings may be deposited in any of a number of simple ways such as by dusting, spraying or settling. To obtain satisfactory operation of tube 10 it is not necessary to use any particular fluorescent materials, so long as some appropriate material is used for each coating which renders it capable of fluorescing in a desired discrete color. However, the following coating materials have been found suitable and therefore are being mentioned herein by way of example. Coating 37 for the front screen 32 may be of zinc silicate with manganese activator, which, as is known, has high efficiency and produces light of a very satisfactory green color. Coating 44 for intermediate screen 36 may be of cadmium borate with manganese activator, which produces a satisfactory red fluorescence. Coating 42 for a back screen 34 may comprise calcium magnesium silicate with titanium activator, which fluoresces blue.

Fig. 4 schematically represents another color tube embodying the present invention in a two-color system. As is apparent from this figure, the target assembly 22′ for this tube comprises a reduced number of elements, i. e., only two fluorescent screens, 32′, 34′, only one apertured plate 46′ and only one control grid 72′. In this type of tube, proper mixing to obtain full color pictures will be possible if the front screen 32′ has a coating 84 which fluoresces in a first color, e. g., blue-green, and the back screen 34′ has a coating 86 which fluoresces in a second color, e. g., red-orange, the two colors being so chosen that white light can be produced by adding them together.

Color switching can be accomplished according to the present invention with easily-obtained control signals, e. g., signals which may be of small amplitude (such as 50 volts peak-to-peak) and may be provided by a source which is not necessarily capable of delivering a great deal of current. It is possible to use signals of small amplitude because by using appropriate D. C. polarizing potentials in the operation of the tube the electrons are either stopped entirely or retarded almost to a standstill in the space between each pair of fluorescent screens. For example, while each of the screens is at a positive potential of several thousand volts, each control grid may be polarized at a D. C. potential very close to (or slightly lower than) that of the electron-gun cathode. If a grid is biased slightly positive (with respect to the cathode), the negative swings of a small amplitude switching voltage will be capable of causing the electrons to stop and be reflected back onto the screen just back of that grid. On the other hand, if it is biased slightly negative, the positive swings will be capable of altering conditions to let the electrons go through.

The reasons why it is possible to use a switching signal source which is not capable of delivering a great deal of current will be set forth below.

In tubes constructed as shown in Fig. 3 (despite the small inter-electrode space of .03 inch) each of the screens may be polarized at about 8000 volts. As a result, after an electron has passed through the retarding field of one of the grids, it will be accelerated back up to a very high energy level regardless of whether it was fully stopped and reflected back by that grid or was merely slowed down but allowed to pass through. Therefore, the bombardment of whichever screen receives the electrons will be sufficiently intense to produce bright fluorescence. Moreover, if desired, the individual screens may be operated at different (high) potentials as one way of determining the relative average brilliances of the individual monochromatic images.

In tests in which a fifty volt peak-to-peak switching voltage was applied to a control grid 5 inches in diameter, the amount of power required was of the order of a few milliwatts. The power requirement became much less when steps were taken to "float" the entire assembly 22. This was done by including an in-series impedance of high value in every connection between an element of the assembly and ground, e. g., in the connection between each of its screens and ground through a high voltage source. The reduction in required power can be attributed to the fact that the capacitance of the entire assembly to ground was much smaller than that between the grid in question and the two screens adjacent to it. The advantage gained by doing this will be even greater in tubes with large-area screens inasmuch as the inter-electrode capacitance is a function of area, which rises as the square of the radius, whereas the capacitance-to-ground (of the entire assembly) is almost a direct function of diameter. In this switching with a floating assembly, the size of the scanned raster will not be noticeably affected even though the potential of the back screen will be constantly changing. The reason for this is that the magnitude of the signal changes are negligible with respect to the D. C. potential of the back screen, i. e., of the order of one percent.

In an embodiment of the kind shown in Fig. 3, where more than one grid is used, it is not possible to accomplish all of the required switching by driving the entire assembly with respect to ground.

An alternate way of avoiding the capacitive load which is presented to the source of switching signal by a target-assembly control grid is to do the switching at the electron gun. In one way of doing this a source of D. C. bias and a video signal source, both of which are free to "float," are connected between the cathode (such as cathode 88 in Fig. 4) and the beam-density control grid (such as grid 90 in Fig. 4) of the electron gun, and the entire gun is driven upward and downward together by the switching signal.

In Fig. 5 there is shown a two-cathode electron gun. This gun, in which the two cathodes 91, 92 have a common beam-density control-grid 93, is suitable for use in the tube of Fig. 4. In using the Fig. 4 tube, as thus modified, it will be possible to polarize one cathode at a D. C.

voltage a little above that of the assembly control-grid 72′ and the other at a voltage a little below it so that the electrons from the former cathode will be reflected onto the back fluorescent screen 34′ and those from the latter will go on through to the front fluorescent screen 32′. Since the two cathodes are at different potentials, each will have a different bias with respect to their common beam-density control-grid 93. Accordingly, different spacings are used between the grid and the respective cathodes. In the case of each cathode this spacing is chosen so that, in accordance with its respective bias to the common density control-grid, that cathode and the grid will cooperate to provide for "class A" beam-density modulation. In using the gun shown in Fig. 5, it will be possible to apply a color picture signal between the density control-grid and both cathodes from a common video voltage source. In such an arrangement, color switching may be accomplished by applying appropriately timed individual blanking signals to the respective cathodes so that at any given interval of time one of them is driven positive enough to cut off its electron flow to the target assembly. In another way of operating the Fig. 4 tube with Fig. 5 electron gun, each of the individual D. C. biases is made large enough to cut off the electron flow from one of the cathodes and the video signals are applied to the two cathodes from separate sources. The video signals reaching each cathode will consist of a train of amplitude-modulated pulses each of which will drive the cathode negative enough so that its flow of electrons to the screen will be turned on for the duration of the pulse to an extent related to a picture value.

It will be understood by those familiar with the art that different ways of operating a tube according to the present invention will have their particular respective advantages. For example, switching at the gun has proven advantageous for an element-sequential (or "dot-sequential") system in which color switching was carried on at a 3.5 megacycle rate. At such a switching frequency it is difficult to provide circuits which pass all of the components of steep-edge square switching waves even if it be assumed that such waves can be provided. For example, a 3.5 megacycle square wave provided by a source which does not have a very low output impedance tends to become somewhat integrated when it is fed into a capacitive load comparable to the inter-electrode capacitance between one of the target-assembly control-grids and its two adjacent screens. Moreover, it is difficult to provide such waves. As a result, it is advantageous to employ sine wave switching where nothing is sacrificed by doing so. A satisfactory way of switching with sine waves is to apply them to an individual cathode such as one of the cathodes shown in Figs. 5 and 6 so that the positive loops may act as blanking signals. Where this is done in addition to the fact that the capacitive load is not large, the wave-form is not critical. Where desired, the leading and trailing edges of a sine wave blanking loop may be steepened by appling a sine wave at the frequency of the first harmonic thereof to the intensity grid of the electron gun or to the appropriate target assembly control grid.

The tube structure shown in Fig. 4 may also be utilized in a three-color system. For example, the apertured plate 46′ may be coated with the material described above as suitable for producing blue fluorescence while the glass plate 40′ is coated with crystalline cadmium sulfide. If this is done, the front screen 32′ can be made to provide two of three monochromatic images. This is possible since cadmium sulfide will fluoresce red in response to electron bombardment of a given current density but will fluoresce green in response to electron bombardment of a given greater current density. In utilizing a tube of such construction it will be necessary to apply color switching signals between the cathode and control grid of the electron gun to control the density of electron bombardment whenever the electrons are allowed to penetrate to the front screen. In such an arrangement the red and green video signals may be carried to the electron gun on individual trains of width-modulated pulses.

In utilizing a tube of the type shown in Fig. 3, the switching may be accomplished by applying to the two control grids different combinations of two simultaneous impulses of equal amplitude and opposite polarities in what amounts to a binary code system. To this end, the tube elements may be polarized so that the cathode is at ground potential (with some appropriate bias between it and the electron-gun control grid) and each of the grids 56 and 72 is a few volts above ground. Two alternating switching voltages of the same peak-to-peak magnitude, which is great enough to drive either of the grids 56 or 72 below ground on the negative swings (negative "impulses"), could be applied as follows: Simultaneous positive swings (positive "impulses") on both grids to energize the front screen; a positive pulse on the back grid and at the same time a negative pulse on the front grid to energize the intermediate screen; and a negative pulse on the back grid and, at the same time, either a negative or positive pulse on the front grid to energize the back screen.

On the other hand, it is possible to operate the embodiment of Fig. 3 by using individual switching pulses of different amplitudes instead of combinations of pulses. For example, the back control grid 72 may be set at a fixed potential above ground and the front control grid 56 at a second potential not as much above ground. Under such conditions a beam directed into the target assembly 22 when the cathode of the electron gun 20 is more positive than the back grid 72 will be reflected back onto the back screen 34 from that grid; when the cathode is at a potential between the positive potentials of the two grids 72 and 56 the beam will pass through the back grid 72 and will be turned back by the front grid 56 to energize the intermediate screen 36; and when the cathode is at zero potential, the beam will pass through both grids 72 and 56 and will energize the front screen 32. This kind of operation can be accomplished by applying a three-step cyclically-repeated wave to the cathode of a single cathode gun. It can also be accomplished with a gun having three cathodes, as shown in Fig. 6. When using such a gun each cathode is set at a suitable potential for causing its electrons to penetrate the assembly 22 to energize a different one of its screens and appropriately phased sine waves are used to blank two of the cathodes during any given interval so that, during it, only electrons from the third one will reach the target.

It has been found that a three-cathode gun can be constructed with the cathodes so close together in a compact triangular pattern as shown in Fig. 6a that the axes of the three beams which they provide are substantially coincident. As a result, the beams provided by these three cathodes will be acted upon in substantially the same manner by a single magnetic deflection yoke without incurring any problem of uniform tracking of the three beams for varying angles of deflection. Thus, if the beams from the three guns are coincident at the center of the target arrangement, they will be substantially coincident at all other points thereon.

Color switching may be at the frequency of the vertical sweeping signal, this being known as field sequential operation, or at that of the horizontal sweeping signal, this being known as line sequential operation, or it may be at an even higher rate, in what is known as element sequential (or "dot sequential") operation.

However, a picture tube according to the present invention does not necessarily have to be employed in a sequential type of operation. For example, an embodiment which includes a plurality of cathodes may be used in a simultaneous type of operation by polarizing each cathode at an appropriate potential for causing its emitted electrons to penetrate the target assembly to a different depth. In this type of operation each beam is made to write on a different screen and all of them to do so at the same time. In such a gun, video signals may be applied individually to the cathodes from separate sources. Of course, it would be possible to use three entirely separate complete guns instead of using one gun with three cathodes. In such a case, the guns should be grouped together as closely as possible so that each beam will be very near to the axis of the deflection system.

While it has been indicated that each of the fluorescent coatings may be formed of a material which fluoresces in a different color, it is within the scope of the invention to use a material which does not necessarily fluoresce in the particular color which its screen is intended to emit (or, to use language used in some of the claims, in which its screen is intended to "luminesce") by using a thin filter coating laid over a coating which fluoresces in white or in a color which includes components comprising the desired color. The filter coating should be thin enough to permit excitation by electrons. Because of the short wavelength of light, it is probable that even a very thin filter will be capable of performing the desired optical function.

It will be apparent to those skilled in the art that cold discharge may take place in an arrangement, such as that of the target assembly 22, where very great potential gradients are maintained between the closely-spaced elements. In testing embodiments of this invention some cold discharge became evident as progressively higher voltage gradients were established between the adjacent elements. It evidenced itself by the fact that spots of different color fluorescence appeared randomly within the assembly. However, this was usually corrected by "spot-knocking," i. e., by polarizing the tube to establish progressively higher and higher gradients than those intended for its operation. The ones of these spots which were occasioned on the way up burned themselves out and did not re-occur for normal operating conditions of the tube. No damage is done to the target assembly if high impedance potential sources are used in spot-knocking. Apparently this is due to the fact that small irregularities and projections (where charges tend to accumulate) can be sputtered away without burning the adjacent fluorescent coating.

It will be apparent from the foregoing that the acceleration of an electron from nearly a standstill to the full velocity with which it is projected against any of the fluorescent screens occurs entirely within the assembly 22. Because the tube is built to accomplish this, it is not necessary for the electrons to be accelerated to their highest velocities in the region where they are deflected. All that is needed is that they have adequate velocities to avoid excessive space charge spreading of the beam and to be projected into the assembly. Accordingly, an auxiliary screen which is polarized at perhaps 700 or 800 volts may be used behind the target assembly as an accelerating electrode. Where this is done, it will be possible to use very much less deflection energy than in cases where the beam passes through an 8000 volt gradient between the gun and the back of the assembly. The spacing between this accelerating screen and the back fluorescent screen does not have to be as close as the spacings within the assembly since there is no problem of optical parallax.

It is possible to apply the broad underlying principles of the present invention to a color television camera tube. Such a tube is disclosed in detail in my co-pending application Serial No. 157,443, which was filed on April 24, 1950. In a camera tube based on such principles, the fluorescent coatings shown in the target assembly 22 herein will be replaced by photo-sensitive coatings. Inasmuch as a fluorescent coating is responsive to electrical kinetic energy of an electron, and a photo-sensitive coating is sensitive to a form of electromagnetic energy (that encountered in the highest frequency portion of the spectrum), the expression "electrical-energy-sensitive" will be used in some of the claims herein as properly descriptive of either type of coating.

What is claimed is:

1. An electron discharge device including an envelope having an electron-gun therein for projecting a beam of electrons along a beam-path, and a plurality of electrodes positioned in the path of said beam and including, in succession, a multi-apertured target electrode having a fluorescent coating on its surface oppositely disposed from said gun, a control electrode adjacent the coated side of said target electrode, and a fluorescent screen adjacent to said control electrode on its other side from said target electrode.

2. An electron discharge device as in claim 1 and including in the envelope a pair of juxtaposed electrodes for producing a large-diameter electron lens across said beam path in a region thereof closer to the multi-apertured target electrode than to said electron gun.

3. An electron discharge device including an envelope having an electron gun therein for directing a beam of electrons along a beam path and a plurality of electrodes positioned in the path of said beam and including in succession a multi-apertured target electrode having a fluorescent coating on its surface oppositely disposed from said gun, a control electrode, another multi-apertured target electrode having a fluorescent coating on its surface oppositely disposed from said gun, another control electrode and a target electrode having a fluorescent coating on its surface facing said gun.

4. An electron discharge device as in claim 1 and including in the envelope a pair of juxtaposed electrodes for producing a large-diameter electron lens across said beam path in a region thereof closer to said first-mentioned multi-apertured target electrode than to said electron gun.

5. An electron discharge device comprising an evacuated envelope containing an electron gun having at least one emissive source of electrons, a fluorescent screen including a multi-apertured plate with one of its surfaces positioned to receive electrons projected from said gun and a coating of fluorescent material on its other surface, a decelerating electrode positioned in front of said coating for reflecting back upon it electrons which are projected through any aperture of said plate while, in the operation of the device, the potential of said electrode has a predetermined relationship to that of a source of electrons of said gun, and another fluorescent screen adjacent to said electrode to receive electrons which have passed through apertures of said plate and also through said electrode.

6. An electron discharge device comprising an evacuated envelope having a window portion and containing a target assembly with its front side facing said window portion, an electron gun contained within the envelope for projecting a beam of electrons at the back of said assembly, said assembly comprising a number of closely-spaced, juxtaposed elements including in order from its back to its front side a back fluorescent screen comprising a multi-apertured plate and a coating of fluorescent material on the front surface of said plate, a decelerating grid in front of said coating, a front fluorescent screen comprising a translucent plate in front of said grid and a fluorescent coating formed on the back surface of said plate, said grid being insulatingly mounted in the assembly with respect to the other elements thereof.

7. An electron discharge device as in claim 6 in which said electron gun comprises two cathodes.

8. A television picture tube comprising an evacuated envelope, an electron gun contained in the envelope and including at least one cathode, a first screen for luminescing in a predetermined color in response to electron bombardment, the first screen including a multi-apertured plate with a back surface facing toward said electron gun and a coating of fluorescent material on the front surface of said plate, a decelerating electrode positioned in front of said coating for reflecting back upon it electrons which are projected through any aperture of said plate while, during operation of the tube, the potential of said electrode has a predetermined relationship to the cathode from which the electrons were emitted, a second screen for luminescing in a different predetermined color in response to electron bombardment, the second screen including a translucent plate and a coating of fluorescent material on its back surface in the path of electrons which have passed through said apertured plate and said electrode.

9. A television picture tube as in claim 8 in which said translucent plate includes a glass plate with a transparent conductive film formed on its back surface to underlie said last-mentioned coating.

10. A television picture tube comprising an evacuated envelope, an electron gun contained in the envelope and including at least one cathode, a first screen for luminescing in a predetermined color in response to electron bombardment, the first screen including a multi-apertured plate with a back surface facing toward said electron gun and a coating of fluorescent material on the front surface of said plate, a decelerating electrode positioned in front of said coating for reflecting back upon it electrons which are projected through any aperture of said plate while, in the operation of the tube, the potential of said electrode has a predetermined relationship to that of a cathode from which the electrons were emitted, a second screen in front of said electrode and having a coating which fluoresces in a different predetermined color, said last-mentioned coating being in a position to be energized by electrons which have passed through the first screen and said electrode.

11. A picture tube as in claim 10 in which said electron gun includes two cathodes which are insulatingly mounted with respect to each other and to the other elements of the tube.

12. An electron discharge device comprising an evacuated envelope having a window portion and containing a target assembly with its front side facing said window portion, an electron gun contained within the envelope for projecting a beam of electrons at the back of said assembly, said assembly comprising a number of closely-spaced, juxtaposed elements including in order from its back to its front side a back fluorescent screen comprising a multi-apertured plate and a coating of fluorescent material on the front surface of said plate, a decelerating grid in front of said coating, a front fluorescent screen comprising a translucent plate in front of said grid and a fluorescent coating formed on the back surface of said plate, the material for one of said coatings being selected to fluoresce in a predetermined color when excited by electron bombardment, the material for the other coating being selected to fluoresce in a second predetermined color when bombarded with electrons in a predetermined range of densities and to fluoresce in a third predetermined color when bombarded with electrons in a different predetermined range of densities, said grid being insulatingly mounted in the assembly with respect to the other elements thereof.

13. An electron discharge device comprising an evacuated envelope having a window portion and containing a target assembly with its front side facing said window portion, an electron gun contained within the envelope for projecting a beam of electrons at the back of said assembly, said assembly comprising a number of closely-spaced juxtaposed elements including in order from its back to its front side a back fluorescent screen comprising a back multi-apertured plate and a coating of fluorescent material on the front surface of said plate, a back decelerating grid in front of said coating, an intermediate fluorescent screen comprising an intermediate multi-apertured plate in front of said grid and a second fluorescent coating formed on the front surface of said intermediate plate, a front decelerating grid in front of said second-mentioned coating, a translucent plate in front of said front grid and a third fluorescent coating formed on the back surface of said plate, each of said grids being insulatingly mounted in the assembly with respect to each other and to the other elements thereof.

14. An electron discharge device as in claim 13 in which said electron gun comprises three cathodes.

15. A television picture tube comprising an evacuated envelope, an electron gun contained within the envelope and including at least one cathode, a first screen for producing fluorescence of a predetermined color in response to electron bombardment, the first screen including a multi-apertured plate with a back surface facing toward said electron gun and a coating of fluorescent material on the front surface of said plate, a decelerating electrode positioned in front of said coating for reflecting back upon it electrons which are projected through any aperture of said plate while, in the operation of the tube, the potential of said electrode has a predetermined relationship to the cathode from which the electrons were emitted, a second screen for producing fluorescence of a second predetermined color, the second screen being positioned in front of said electrode and including a second apertured plate with its back surface facing toward said electrode and a coating of fluorescent material on its front surface, and a second decelerating electrode positioned in front of said last-mentioned coating for reflecting back upon it electrons which are projected through any aperture of said second plate while, in the operation of the tube, the potential of said second electrode has a predetermined relationship to the cathode from which the electrons were emitted.

16. A television picture tube as in claim 15 which further comprises a third screen for producing fluorescence in a third predetermined color, the third screen including a translucent plate with its back surface facing said second electrode and a coating of fluorescent material carried on said back surface.

17. In an electron discharge device, a target assembly comprising in juxtaposition a number of closely-spaced, multi-apertured, flat-surfaced elements, a rigid frame for supporting each of said elements at its edges, each frame comprising a short tubular portion one end of which has all of its farthest extending end surfaces lying in a flat plane, and means associated with each frame for stretching one of said elements tautly across said end of its tubular portion, said stretching means including a ring in coaxial nested relationship with said tubular portion and a plurality of screws each individually rotatable to move a respective portion of the periphery of said ring in an axial direction with respect to a corresponding portion of the periphery of said tubular portion.

18. An electron discharge device comprising an evacuated envelope having a window portion and containing an electron gun and a group of closely-spaced target elements, said group of elements including a multi-apertured plate positioned so that electrons from said gun may be projected through its apertures from one of its sides and so that its other side faces toward said window portion, a decelerating electrode positioned adjacent to said last-mentioned side of said plate for reflecting back upon it electrons which are projected through any aperture of said plate while, in the operation of the device, the potential of said electrode has a predetermined relationship with that of a predetermined part of the electron gun, a screen positioned adjacent to said electrode on its opposite side from said apertured plate to receive electrons which are projected through both said plate and said electrode, said electrode and said screen being formed to afford a high percentage of light transmission in directions between said plate and said window portion.

19. An electron discharge device comprising an evacuated envelope having a window portion and containing an electron gun and a group of closely-spaced target elements, said group including a first electrical-energy-sensitive screen which comprises a multi-apertured plate positioned so that electrons from said gun may be projected through its apertures from one of its sides while its other side faces toward said window portion and an electrical-energy-sensitive coating on said other side, a decelerating electrode positioned adjacent to said coating for reflecting back upon it electrons which are projected through any aperture of said plate while, in the operation of the device, the potential of said element has a predetermined relationship with a predetermined part of the electron gun, a second electrical-energy-sensitive screen positioned adjacent to said electrode on its opposite side from said first screen to receive on a sensitive surface electrons which are projected through apertures of said plate and said electrode, said electrode and said second screen being formed to afford a high percentage of light transmission in directions between said plate and said window portion.

20. An electron discharge device comprising an evacuated envelope having a window portion and containing an electron gun and a group of closely-spaced target elements, said group of elements including a first screen for co-operating with an electron beam from said gun to translate intelligence between one form as light constituting a monochromatic image and another as a corresponding electrical signal, said first screen being carried on a multi-apertured plate positioned so that electrons from said gun may be projected through its apertures from one of its sides while its other side faces toward said window portion, a decelerating electrode positioned adjacent to said last-mentioned side of said plate for reflecting back upon it electrons which are projected through any aperture of said plate while, in the operation of the device, the potential of said electrode has a predetermined relationship with that of a predetermined part of the electron gun, a second screen for similarly co-operating with an electron beam to translate intelligence in which one form is as light of a different color constituting a monochromatic image and the other is as a corresponding electrical signal, the second screen being positioned adjacent to said electrode on its opposite side from said first screen to receive electrons which are projected through both said plate and said electrode, said electrode and said second screen being formed to afford a high percentage of light transmission in directions between said plate and said window portion.

21. An electron discharge device comprising an evacuated envelope having a window portion and containing an electron gun and a group of closely-spaced target elements, said group of elements including a first electrical-energy-sensitive screen, which comprises a multi-apertured plate positioned so that electrons from said gun may be projected through its apertures from one of its sides while its other side faces toward said window portion and an electrical-energy-sensitive coating on said other side, a decelerating electrode positioned adjacent to said coating for reflecting back upon it electrons which are projected through any apertures of said plate while, in the operation of the device, the potential of said electrode has a predetermined relationship to that of a predetermined part of the electron gun, a second electrical-energy-sensitive screen positioned adjacent to said electrode on its opposite side from said first screen to receive electrons which are projected through apertures of said plate and said electrode, said second screen comprising a translucent plate and an electrical-energy-sensitive coating carried on the surface of said plate which faces said electrode, said electrode being formed to have a high percentage of light transmission between said first-mentioned coating and said window portion.

22. An electron discharge device as in claim 21 in which said translucent plate comprises a glass plate and a conductive translucent film on its surface which carries said coating.

23. An electron discharge device comprising an evacuated envelope having a window portion and containing an electron gun and a group of closely-spaced target elements, said group of elements including a first electrical-energy-sensitive screen, which comprises a multi-apertured plate positioned so that electrons from said gun may be projected through its apertures from one of its sides while its other side faces toward said window portion and an electrical-energy-sensitive coating on said other side, a decelerating electrode positioned adjacent to said coating for reflecting back upon it electrons which are projected through apertures of said plate while, in the operation of the device, the potential of said electrode has a predetermined relationship to that of a predetermined part of the electron gun, a second electrical-energy-sensitive screen positioned adjacent to said electrode on its opposite side from said first screen, said second screen comprising a second multi-apertured plate having a higher ratio of apertured to non-apertured surface than said first-mentioned plate and an electrical-energy-sensitive coating on its surface which faces away from said electrode, said electrode and said second apertured plate being formed with a sufficient number of openings of sufficient size to afford a high percentage of light transmissions in directions between said first screen and said window portion, and a front decelerating electrode positioned adjacent to said second-mentioned coating for reflecting electrons back thereonto while, in the operation of the device, a predetermined potential relationship exists between this electrode and a predetermined part of the electron gun.

STANLEY V. FORGUE.

REFERENCES CITED

The following references are of record in the file of this patent:

UNITED STATES PATENTS

| Number | Name | Date |
|---|---|---|
| 2,124,224 | Batchelor | July 19, 1938 |
| 2,461,515 | Bronwell | Feb. 15, 1949 |